Patented Feb. 26, 1935

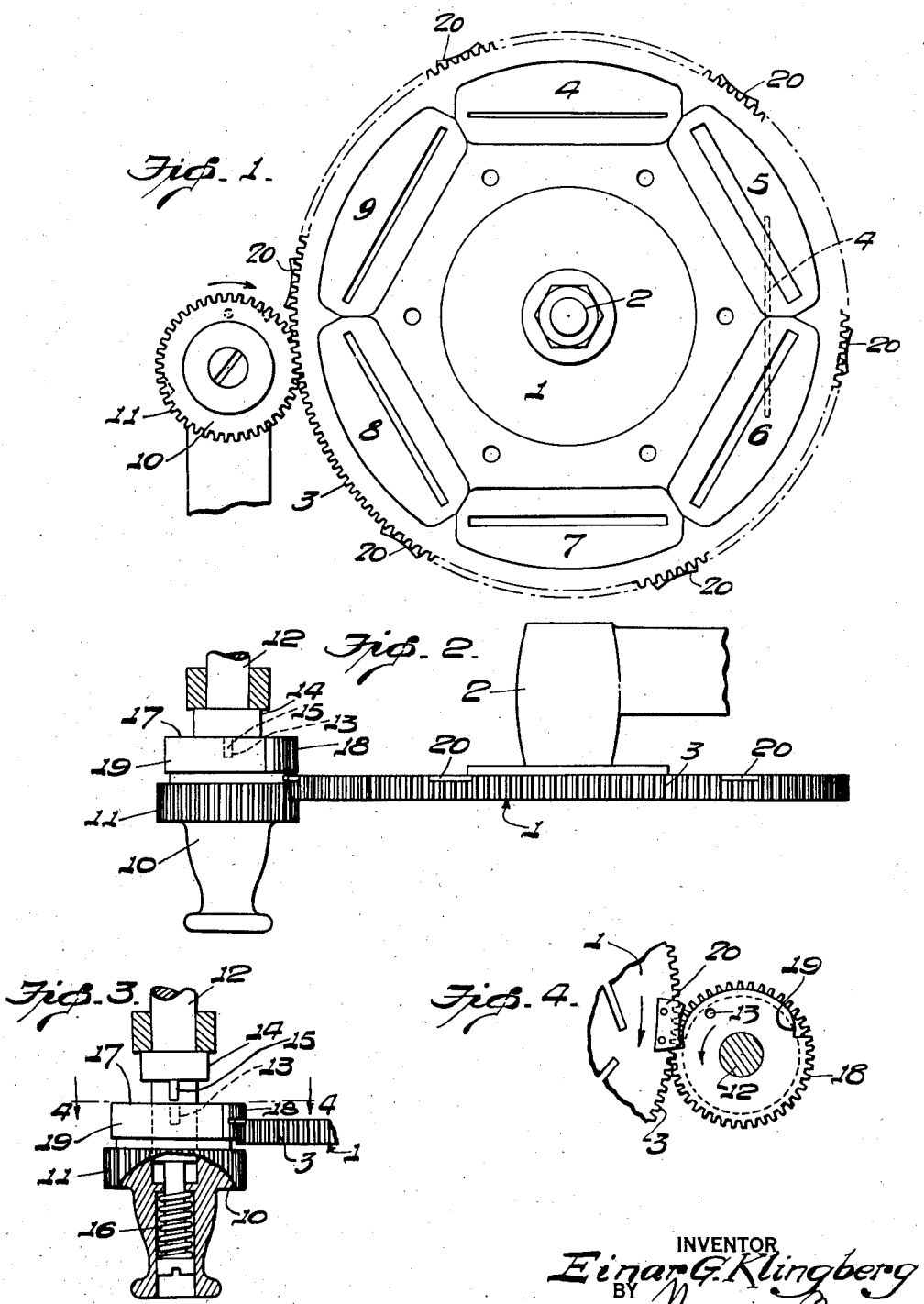

1,992,918

UNITED STATES PATENT OFFICE 1,992,918

MOLD WHEEL ADJUSTING DEVICE

Einar G. Klingberg, Long Island City, N. Y., assignor to Intertype Corporation, Brooklyn, N. Y., a corporation of New York Application June 25, 1934, Serial No. 732,317
In Germany March 17, 1934

8 Claims. (Cl. 199—48)

This invention relates to improvements in line casting machines of the class shown and described generally in U. S. Letters Patent No. 436,532 granted September 16, 1890, employing a mold carrying wheel or disk which is rotatable by a pinion to present the mold thereon used for the casting of type bars or slugs, successively in slug casting and slug ejecting positions, and it relates more particularly to the modern machines of this class wherein the mold wheel or disk carries a plurality of molds and the driving pinion may be uncoupled from its operating shaft and rotated manually to bring one or another of such molds into position for use.

In modern line casting machines of this class several molds, usually four, are arranged on the rotatable disk or mold wheel and the pinion for driving the disk or wheel is mounted on a shaft which is operated by gear segments on one of the driving members on the main cam shaft of the machine. The pinion and disk are provided with teeth entirely around their respective peripheries, usually in the ratio of four teeth on the disk to one tooth on the pinion, so that one complete rotation of the latter will turn the disk 90°. One of the gear segments turns the disk 90° to bring the mold in use from its normal or ejecting position to casting position. The other gear segment turns the disk through 270° to bring the mold, with the slug cast therein, from casting position around to ejecting position again, as disclosed in the hereinbefore mentioned patent.

The pinion, in machines of this class as usually constructed, is normally pressed against a collar fast to its shaft by a spring whereby a driving stud or pin in the collar is kept engaged in a hole in the face of the pinion, such a coupling arrangement for the pinion being disclosed in U. S. Letters Patent No. 758,103 granted April 26, 1904. By pulling forwardly on the pinion, the operator can disengage the driving stud from the pinion and turn the disk to bring any one of the molds thereon into use, the teeth on the pinion being sufficiently wide to always remain in mesh with the teeth on the disk.

If the mold wheel or disk carries four molds, symmetrically arranged thereon, then the driving stud will be axially aligned with the one hole in the pinion after each full rotation thereof or after each 90 degree rotation of the disk. This is so because the disk has 168 teeth and the pinion 42 teeth, a ratio of four to one. However, if the disk carries say 3, 5, 6 or 8 molds, this ratio of the teeth would require turning it 120°, 72°, 60° or 45° respectively, to bring any succeeding mold into position for use. In such cases it is obvious that the driving stud will not align axially with the single hole in the pinion.

The primary object of the present invention is to provide a novel construction whereby, with a single hole and driving stud, the pinion may be uncoupled and given one or more complete turns as usual to bring any successive one of 3, 5, 6 or 8 molds on the disk into operative position, thus obviating the objection inherent in the means heretofore proposed for coupling the pinion in different angular positions to its driving shaft.

To these and other ends, the invention consists in certain improvements and combinations and arrangements of parts all as will be hereinafter more fully described, the features of novelty being pointed out particularly in the claims at the end of this specification.

In the accompanying drawing:—

Fig. 1 is a front elevation of the mold wheel and cooperative driving pinion of a line casting machine, the same being constructed in accordance with the present invention;

Fig. 2 is a top plan view of the mold wheel and pinion shown in Fig. 1;

Fig. 3 is a top plan view, partly in section, of the pinion and a portion of the mold wheel, the pinion being shown uncoupled from its driving shaft; and Fig. 4 represents a vertical section taken on the line 4—4 in Fig. 3 and looking forwardly or in the direction of the arrows in said figure.

Similar parts are designated by the same reference characters in the different figures.

The preferred embodiment of the invention is shown in the accompanying drawing wherein 1 designates the mold wheel or disk which may be mounted rotatably on a bearing 2 carried by the usual mold wheel slide, and having gear teeth 3 arranged entirely around its periphery, the mold wheel being shown, for example, as carrying six slug casting molds 4, 5, 6, 7, 8 and 9 mounted symmetrically thereon in a circle concentric with the axis of rotation thereof. The pinion 10, which is provided with gear teeth 11 arranged entirely around its periphery and of a number equal to one-quarter of the number of teeth on the periphery of the mold wheel, is mounted on its driving shaft 12 so that it is shiftable axially thereon, the rear face of the pinion having a hole or recess 13 therein, and a collar 14 is fixed on the shaft 12 and has a stud or pin 15 fixed therein in a position to enter the hole 13 in the pinion and thereby couple the pinion to its driving shaft when the pinion is against the collar 14, as shown in Fig. 2. The pinion is normally held in such coupled relation with its driving shaft by a spring 16 contained within the pinion hub, the teeth on the pinion being then meshed with the teeth on the mold wheel, so that rotation of the pinion shaft by the usual means in the machine will effect the necessary rotary movements of the mold wheel to carry the mold in use successively into slug casting and slug ejecting positions, as usual. The spring 16 however permits the pinion to be pulled forwardly on its shaft into the position shown in Fig. 3, the stud 15 being then disengaged from the hole 13 in the pinion so that the latter is then uncoupled from its driving shaft, and the gear teeth 11 on the pinion are then out of mesh with the gear teeth on the mold wheel, the pinion being then free for manual rotation on its shaft.

The active mold, in this case the mold 4 in Fig. 1, normally stands in the vertical position indicated by the dotted lines in that figure, and upon starting the machine, the mold wheel or disk is rotated 90° by the pinion 10, as usual, to bring this mold to the horizontal top position shown in full lines in Fig. 1, this being the usual casting position. After casting, the disk is rotated by the pinion through 270° to bring the mold 4 back again to the dotted line position where the slug cast therein is ejected.

According to the present invention, in order to bring a succeeding mold of 3, 5, 6 or 8 molds on the mold wheel or disk into operative position by one or more full rotations of the pinion by hand, only enough teeth are provided on an extended width of the pinion engageable with the teeth on the disk when the pinion is uncoupled to turn the disk through the angle between two adjacent molds. For example, with six molds, as chosen to illustrate the invention, arranged symmetrically at 60 degree intervals, it is proposed to provide the required number of teeth on the extended width of the pinion to turn the disk through 60 degrees for one full turn of the pinion. Obviously, two full turns of the pinion would turn the disk through 120 degrees which would be required to bring a succeeding mold into operative position if only three molds were present or to bring into operative position every second mold of the six illustrated. With five molds present enough teeth would be provided on the extended width of the pinion to turn the disk 72 degrees for each complete rotation of the pinion and with eight molds, sufficient teeth to turn the disk 45 degrees for one rotation, and so on.

In the embodiment of the invention shown, the pinion is provided with an extension 17 which is brought into cooperation with the mold wheel when the pinion is pulled forwardly into uncoupled position, this extension of the pinion having gear teeth 18 occupying a segment of its periphery and adapted to mesh with the gear teeth on the mold wheel, and the remainder of the pinion extension being blank or untoothed, as indicated at 19, the partially toothed extension of the pinion enabling the mold wheel or disk to be rotated by hand through the angle between any two adjacent molds thereon, according to the number of molds on the mold wheel, by one or more full revolutions of the pinion.

Thus, the pinion 10, for a mold wheel carrying six molds, is provided on its extended width, with twenty-four successive teeth 18 followed by the blank or untoothed periphery 19 whereby the mold wheel or disk will stand idle during part of each complete rotation or revolution of the pinion. To prevent the mold wheel or disk from turning of itself during the idling period, idling blocks 20 concaved or formed to suit the contour of the blank periphery 19 of the pinion extension, are provided on the mold wheel or disk in positions corresponding with the respective mold positions thereon, or, in the present instance, at 60 degree intervals. The circumferential location of the blocks 20 however is such that they will not obstruct forward movement of the pinion while the mold wheel stands in a normal position. This precaution is necessary since these blocks project beyond the teeth on the mold wheel or disk and would otherwise stand in front of the teeth 18 on the extended width of the pinion.

While it is true that 28 teeth on the pinion extension would ordinarily come into action to turn the mold wheel or disk through 60 degrees based upon the four to one ratio, only 24 of these teeth are actually necessary. This is due to the fact that five pinion teeth are actively engaged at the same time during turning of the mold wheel or disk, and in order to stop the disk definitely or abruptly at the 60 degree point, it is necessary to drop four of these active teeth, leaving the fifth one in advance of the 28th one or the 24th tooth, the last one to work on the disk, the idling block 20 then engaging the concentric blank or untoothed portion 17 of the pinion extension and holding the mold wheel or disk at rest.

By this arrangement, each complete turn or revolution of the pinion will bring the single hole 13 into alignment with the driving stud 15 while the mold wheel or disk will be rotated only through the angle determined by the circumferential extent of the active teeth 18 on the pinion extension and the mold wheel or disk will stand idle during the balance of the rotating movement of the pinion. Thus, with the blank or untoothed periphery on the extension of the pinion standing in the position shown in Fig. 1, forward pull on the pinion will disengage it from the stud 15 and subsequent rotation of the pinion will cause the disk to turn, then idle, then turn again, the total angular travel of the disk being 60 degrees, whereupon the pinion will be in position to again couple to the driving stud.

It is to be understood, of course, that in any case, the calculated number of teeth provided on the extended portion of the pinion must be divisible evenly into the total number of teeth on the periphery of the mold wheel, and that the number of teeth on the mold wheel may be chosen acordingly. Thus, while a mold wheel carrying 3, 6 or 8 molds may be provided as usual with 168 teeth, and a pinion may be employed the extended width of which is provided with teeth of a number calculated to rotate the mold wheel through the appropriate angle at each one or more turns of the pinion, but the actual number of which teeth may be less, as hereinbefore explained, a mold wheel having, for example, 5 molds spaced symmetrically thereon may be provided with say 160 teeth, in which case the extended width of the pinion may be calculated to have 32 teeth so that each full turn of the pinion will rotate the mold wheel through 72 degrees, and that portion of the pinion which is normally engageable with the mold wheel to turn it to its usual operative positions for casting and ejecting slugs may have 40 teeth in order to maintain the usual 4 to 1 ratio, although the actual number of teeth on the extended width of the pinion required to bring the mold wheel to rest after rotating it through 72 degrees may be 4 less than said calculated number, for the same reasons hereinbefore explained with respect to the pinion shown.

I claim as my invention:—

1. In or for a line casting machine, a rotatable mold carrier having teeth thereon for rotating it, a cooperative pinion, and a driving shaft having means for coupling and uncoupling the pinion with respect thereto, said pinion having a toothed portion engageable with the teeth on the mold carrier to rotate it and having an untoothed portion to permit the mold carrier to stand idle during part of each complete rotation of the pinion while uncoupled from its shaft.

2. In or for a line casting machine, a rotatable mold wheel carrying a plurality of molds and having teeth thereon for rotating it, a cooperative pinion, and a driving shaft having means for coupling and uncoupling the pinion with respect thereto, said pinion having an extension the periphery of which is toothed to an extent to engage the teeth on the mold wheel and to rotate the latter through an angle to remove one mold thereon from operative position and bring an adjacent mold into operative position, another portion of the periphery of said pinion extension being untoothed to permit the mold wheel to stand idle during part of a complete rotation of the pinion while uncoupled from said shaft.

3. In or for a line casting machine, a rotatable mold wheel carrying a plurality of molds arranged symmetrically about its axis and having teeth for rotating it, a pinion for rotating the mold wheel, and a driving shaft on which the pinion is movable axially and having means for coupling and uncoupling the pinion with respect thereto when the pinion is moved axially thereon, the pinion having an extension which will be opposite to the teeth on the mold wheel when the pinion is moved into position to uncouple it from said shaft, said pinion extension having its periphery toothed to an extent to rotate the mold wheel through an angle equal to the angular distance between adjacent molds on the mold wheel and having the remainder of its periphery untoothed to permit the mold wheel to stand idle during part of each complete revolution of the pinion.

4. In or for a line casting machine, a rotatable mold wheel having teeth thereon for rotating it, a cooperative pinion, a driving shaft having means for coupling and uncoupling the pinion with respect thereto, said pinion having a toothed portion engageable with the teeth on the mold wheel for rotating it and having an untoothed portion, and elements on the mold wheel engageable with said untoothed portion of the pinion to hold the mold wheel against rotation during part of a complete revolution of the pinion.

5. In or for a line casting machine, a rotatable mold wheel carrying a plurality of molds arranged symmetrically about its axis and having teeth for rotating it, a pinion for rotating the mold wheel, a driving shaft having means for coupling and uncoupling the pinion with respect thereto, the pinion having a toothed portion of an extent to rotate the mold wheel through an angle equal to the angular distance between adjacent molds thereon and having a concentric untoothed portion, and a block on the mold wheel engageable with said untoothed portion of the pinion to hold the mold wheel against rotation during a part of a complete revolution of the pinion.

6. In or for a line casting machine, a rotatable mold wheel carrying a plurality of molds, a drive shaft, and driving means engageable and disengageable with respect to said shaft for rotating said mold wheel, one revolution of said driving means when engaged with said shaft being operative to rotate the mold wheel through a given angular displacement, and one revolution of said driving means when disengaged from said shaft being operative to rotate the mold wheel through a different angular displacement.

7. In or for a line casting machine, a rotatable mold carrier, driving means for rotating said carrier, and a driving shaft having means for coupling and uncoupling said driving means with respect thereto, said driving means being engageable with the mold carrier at the uncoupled position of said driving means to rotate it and disengageable therefrom during such rotation to permit the mold carrier to stand idle while completing the rotation of the driving means to its coupling position with said driving shaft.

8. In or for a line casting machine, a rotatable mold carrier having teeth thereon for rotating it, a cooperative pinion, and a driving shaft having means for coupling and uncoupling the pinion at a single point with respect thereto, said pinion having a toothed portion engageable with the teeth on the mold carrier in the uncoupled position of said pinion to rotate the mold carrier and having an untoothed portion to permit the mold carrier to stand idle while completing the rotation of the pinion to its coupling position with said driving shaft.

EINAR G. KLINGBERG.